Sept. 18, 1956  C. W. IRWIN ET AL  2,763,518
OIL-LUBRICATED ANTIFRICTION BEARING ASSEMBLY
Filed July 30, 1954
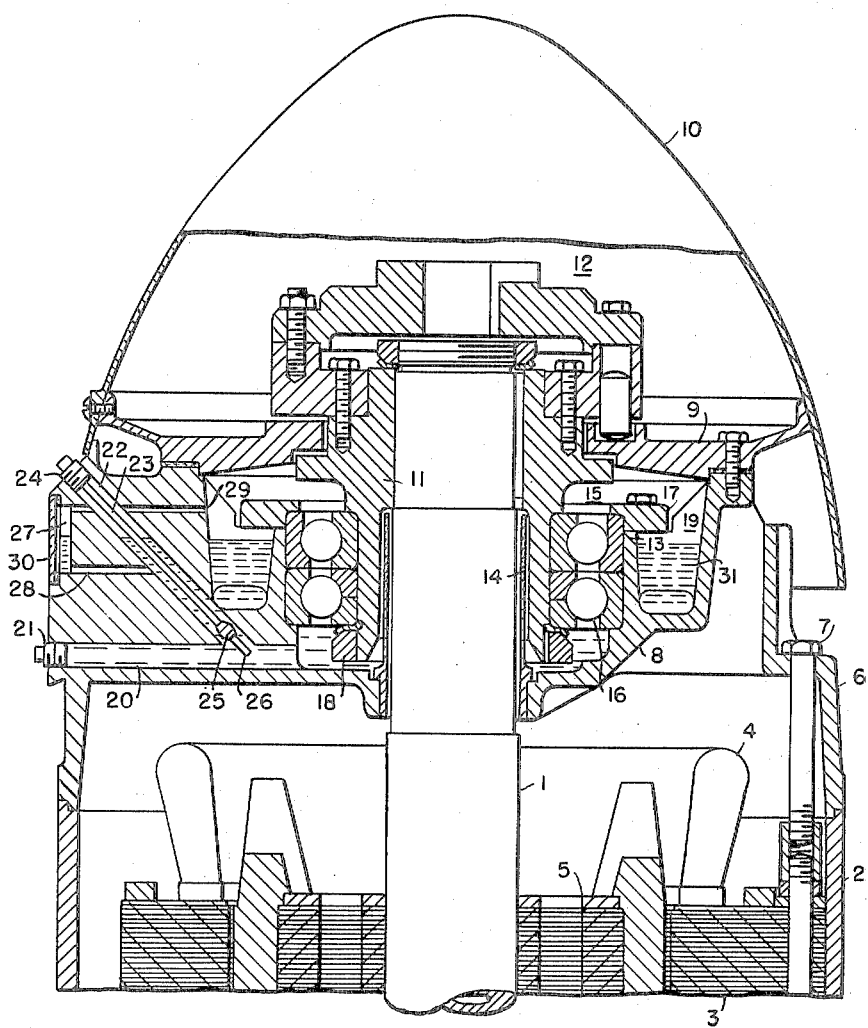
WITNESSES:
E. G. M. Closkey
Leon M. Garman
INVENTORS
Charles W. Irwin
and Ernest E. Edgell.
BY
F. P. Lyle
ATTORNEY

United States Patent Office 2,763,518
Patented Sept. 18, 1956

2,763,518

OIL-LUBRICATED ANTIFRICTION BEARING ASSEMBLY

Charles W. Irwin, Eggertsville, and Ernest E. Edgell, Williamsville, N. Y., assignors to Westinghouse Electric Corporation, Pittsburgh, Pa., a corporation of Pennsylvania Application July 30, 1954, Serial No. 446,856

10 Claims. (Cl. 308—187)

The present invention relates to oil-lubricated antifriction bearing assemblies, and more particularly to a bearing construction which permits rapid draining of oil and rapid filling with oil.

In vertical, oil-lubricated antifriction bearings it is usually necessary to meter the flow of oil to the bearing during operation, in order to prevent having excess oil in the bearing which would result in undesirable churning and splashing of the oil and possible overheating of the bearing. This is usually done by providing an oil chamber separate from the bearing chamber, with a restricted opening between the chambers through which oil flows at a predetermined rate during operation, so as to supply only the necessary amount of oil to the bearing with no substantial excess.

It is necessary from time to time to drain the oil from such bearings and refill with new oil. With the conventional construction, this is a very lengthy process because the oil which fills the bearing chamber when the bearing is at rest drains out very slowly through the restricted metering opening, and in bearings of relatively large size containing a considerable quantity of oil, it frequently takes more than an hour to completely drain the oil. A similar length of time is required for refilling the bearing, since the oil must flow into the bearing chamber through the small metering opening. This extremely long time required for draining a bearing and refilling it is, of course, highly undesirable.

The principal object of the present invention is to provide a vertical, oil-lubricated antifriction bearing assembly in which flow of oil to the bearing during operation is metered through a restricted opening, but in which the oil can rapidly be drained and the bearing can rapidly be refilled with oil.

A more specific object of the invention is to provide a vertical, oil-lubricated antifriction bearing assembly in which oil flows to the bearing during operation through an opening which is restricted by a plug to meter the flow of oil at a predetermined rate, and in which the plug is readily removable to permit free flow of oil from and into the bearing chamber for draining and refilling, so that these operations can be carried out quite rapidly.

Other objects and advantages of the invention will be apparent from the following detailed description, taken in connection with the accompanying drawing, the single figure of which is a longitudinal sectional view of a vertical bearing assembly embodying the invention.

The invention is shown in the drawing, for the purpose of illustration, applied to a vertical, ball bearing electric motor of a type frequently used for driving pumps, although it will be obvious that the usefulness of the new bearing assembly is not restricted to this specific application. The drawing shows the upper bearing of a vertical electric motor having a hollow shaft 1. The motor may have a frame 2 supporting a laminated stator core 3 which carries primary windings 4, and a rotor member 5 of any suitable type is secured on the shaft 1. The particular construction of the motor itself has not been shown in detail since it is not a part of the invention, and the bearing assembly is applicable to any device having a vertical shaft.

The upper end of the motor is closed by an end bracket 6, which may be secured to the frame 2 in any desired manner, as by bolts 7, and which incorporates a bearing housing 8. The upper end of the bracket 6 is closed by a cover plate 9 which may support a removable hood 10. A sleeve or quill shaft 11 is keyed or otherwise secured to the upper end of the shaft 1 for rotation therewith, and a clutch and non-reverse ratchet mechanism, generally designated 12, may be provided for connecting the shaft 1 to the upper end of the shaft of a driven device (not shown), which may extend upward through the hollow shaft 1.

The bearing housing 8 has an internal circular wall 13, and a stationary sleeve or tubular member 14 extends up from the bottom of the bearing housing, between the shaft 1 and quill shaft 11, and cooperates with the wall 13 to form an annular bearing chamber 15. An antifriction bearing 16 is supported in the bearing chamber 15. The bearing 16 is shown as a double-row ball bearing, although any suitable type of antifriction bearing might be used. The outer races of the bearing 16 are clamped in the bearing chamber 15 in any suitable manner, as by a locking plate 17 which clamps the races against a shoulder in the bearing chamber. The inner races of the bearing 16 are clamped on the quill shaft 11 by means of a lock nut 18, or in any other suitable manner.

The bearing housing 8 also has an annular oil chamber 19 outside the bearing chamber 15, between the wall 13 and the outer wall of the housing. A substantially horizontal oil drain passage 20 extends generally radially from the bottom of the bearing chamber 15 to the outside of the bearing housing, and is normally closed by a threaded plug 21. An oil filling passage 22 also extends through the bearing housing from the outside, at a suitable angle from the vertical, as shown on the drawing, and extends into the drain passage 20 at a point adjacent the bearing chamber 15. The filling passage 22 is disposed in such a position that it intersects the lower part of the oil chamber 19, so as to communicate with that chamber, as clearly shown on the drawing, thus providing an opening between the oil chamber and the bearing chamber through the filling passage 22 and drain passage 20.

A removable rod 23 is disposed in the filling passage 22. One end of the rod 23 is secured to, or made integral with, a threaded plug member 24 which threads into the housing to retain the rod in position. A plug member 25 is mounted on the other end of the rod 23 and is positioned so that when the rod is in place, the plug member 25 is located in the portion of the passage 22 which forms part of the opening between the oil chamber 19 and bearing chamber 15. The plug 25 is made of such size that it does not completely close the passage but provides a restricted annular opening through which oil can flow at a predetermined rate during operation of the bearing. A permanent magnet 26 may be mounted on the plug member 25, if desired, to remove particles of magnetic material from the oil and thus prevent such particles from getting into the bearing.

A sight gauge is preferably provided in the housing for visually observing the level of oil in the bearing. Such a gauge may consist of a recess 27 in the outer surface of the bearing housing, with a horizontal passage 28 connecting the bottom of the recess 27 to the filling passage 22, which is in communication with the oil chamber, and a horizontal passage 29 at the top of the recess 27 communicating with the space above the oil chamber.

The front of the recess is closed by a cover 30 of glass or transparent plastic to permit observation of the oil level.

The bearing assembly is filled with oil 31 up to a predetermined level which provides the desired quantity of oil. When the shaft 1 is at rest, the oil will, of course, fill both the bearing chamber 15 and oil chamber 19 to the same level. When the shaft is running, however, the action of the bearing 16 will throw excess oil out of the bearing chamber 15 and into the oil chamber 19. Oil flows from the oil chamber 19 through the restricted opening around the plug member 25 into the bottom of the bearing chamber 15, to supply a predetermined amount of oil to the bearing which is just sufficient for proper lubrication with no substantial excess.

When it is desired to drain the oil from the bearing, it is only necessary to remove the rod 23 with its plug member 25, which is readily done by unscrewing the plug 24 so that the rod can be withdrawn from the passage 22. The drain plug 21 can then be removed and it will be seen that the oil can flow freely from both chambers to the drain passage 20 and thus the bearing can rapidly be drained. To fill the bearing with oil, the drain plug 21 is replaced and the bearing can then be filled through the filling passage 22, the oil flowing freely through the passages into both the bearing chamber and the oil chamber. When the bearing has been filled to the desired oil level, as observed in the sight gauge 27, the rod 23 is inserted in position and the bearing is ready for operation in the manner described above. It will be seen that both draining and filling operations can thus be carried out in a minimum of time since the oil flows freely both in and out of the assembly.

It should now be apparent that an oil-lubricated antifriction bearing assembly has been provided in which flow of oil to the bearing during operation is metered at a predetermined rate, but in which draining of the oil and filling of the bearing with oil can be carried out very rapidly, as compared to the extremely long time required for this operation with prior constructions. The rapid draining and filling of the bearing also makes it possible to flush the bearing and oil chamber with a light oil or flushing liquid before refilling with lubricating oil, which could not readily be done in conventional constructions, because of the extremely long time required.

A specific embodiment of the invention has been shown and described for the purpose of illustration, but it is to be understood that various modifications and other embodiments are possible and are included within the scope of the invention.

We claim as our invention:

1. A vertical antifriction bearing assembly comprising housing means having a bearing chamber, an antifriction bearing in said chamber, the housing means also having an oil chamber with an opening communicating with the bearing chamber, a passage extending to the outside of the housing means and communicating with the oil chamber, and a solid plug member normally positioned in said opening and partially closing the opening to limit flow of oil therethrough, the plug member being removable through said passage.

2. A vertical antifriction bearing assembly comprising housing means having a bearing chamber, an antifriction bearing in said chamber, the housing means also having an oil chamber with an opening communicating with the bearing chamber, a passage extending to the outside of the housing means and communicating with the oil chamber, a solid plug member normally positioned in said opening and partially closing the opening to limit flow of oil therethrough, the plug member being removable through said passage, and a permanent magnet mounted on said plug member.

3. A vertical antifriction bearing assembly comprising housing means having a bearing chamber and an oil chamber, an antifriction bearing in the bearing chamber, an oil passage extending through the housing means to the outside and communicating with the oil chamber, the housing means having an opening between said chambers, said opening constituting an extension of the oil passage, and a solid plug member normally positioned in the opening and partially closing the opening to restrict flow of oil therethrough, the plug member being removable through the oil passage.

4. A vertical antifriction bearing assembly comprising housing means having a bearing chamber and an oil chamber, an antifriction bearing in the bearing chamber, an oil passage extending through the housing means to the outside and communicating with the oil chamber, the housing means having an opening between said chambers, said opening constituting an extension of the oil passage, a removable rod extending through the oil passage, and a solid plug member mounted on the rod, said plug member normally being positioned in the opening and partially closing the opening to restrict flow of oil therethrough.

5. A vertical antifriction bearing assembly comprising housing means having a bearing chamber and an oil chamber, an antifriction bearing in the bearing chamber, an oil passage extending through the housing means to the outside and communicating with the oil chamber, the housing means having an opening between said chambers, said opening constituting an extension of the oil passage, a rod extending through the oil passage, means for removably securing the rod in position, a solid plug member mounted on the rod, said plug member normally being positioned in the opening and partially closing the opening to restrict flow of oil therethrough, and a permanent magnet mounted on the plug member.

6. A vertical antifriction bearing assembly comprising housing means having a bearing chamber and an oil chamber, an antifriction bearing in the bearing chamber, an oil drain passage extending through the housing means from the bearing chamber, an oil filling passage extending through the housing means and communicating with the oil chamber, said oil filling passage extending to the oil drain passage to provide an opening for flow of oil between the two chambers, a plug member disposed in said opening to restrict flow of oil therethrough, and means for removing said plug member through one of said passages.

7. A vertical antifriction bearing assembly comprising housing means having a bearing chamber and an oil chamber, an antifriction bearing in the bearing chamber, an oil drain passage extending through the housing means from the bearing chamber, an oil filling passage extending through the housing means and communicating with the oil chamber, said oil filling passage extending to the oil drain passage to provide an opening for flow of oil between the two chambers, a rod extending through one of said passages, means for removably securing the rod in position, and a plug member mounted on the rod and positioned in said opening to restrict flow of oil therethrough.

8. A vertical antifriction bearing assembly comprising housing means having a bearing chamber and an oil chamber, an antifriction bearing in the bearing chamber, an oil drain passage extending through the housing means from the bearing chamber, an oil filling passage extending through the housing means and communicating with the oil chamber, said oil filling passage extending to the oil drain passage to provide an opening for flow of oil between the two chambers, a rod extending through one of said passages, means for removably securing the rod in position, a plug member mounted on the rod and positioned in said opening to restrict flow of oil therethrough, and a permanent magnet mounted on the plug member.

9. A vertical antifriction bearing assembly comprising housing means having a bearing chamber and an oil chamber, an antifriction bearing in the bearing chamber, an oil drain passage extending substantially horizontally through the housing means from the bottom of the bearing chamber, an oil filling passage extending through the housing means, the oil filling passage communicating with the oil chamber and extending into the oil drain passage, a removable rod extending through the oil filling passage, and a plug member mounted on the rod, the plug member being positioned between the oil chamber and the oil drain passage to restrict flow of oil between the oil chamber and the bearing chamber.

10. A vertical antifriction bearing assembly comprising housing means having a bearing chamber and an oil chamber, an antifriction bearing in the bearing chamber, an oil drain passage extending substantially horizontally through the housing means from the bottom of the bearing chamber, and oil filling passage extending through the housing means, the oil filling passage communicating with the oil chamber and extending into the oil drain passage, a rod extending through the oil filling passage, means for removably securing the rod in position, a plug member mounted on the rod and positioned between the oil chamber and the oil drain passage to restrict flow of oil between the oil chamber and the bearing chamber, and a permanent magnet mounted on the plug member.

References Cited in the file of this patent

UNITED STATES PATENTS

| | | |
|---|---|---|
| 1,277,439 | Long | Sept. 3, 1918 |

FOREIGN PATENTS

| | | |
|---|---|---|
| 695,665 | Germany | Aug. 30, 1940 |